United States Patent
Sartore et al.

(12) 
(10) Patent No.: US 6,823,987 B2
(45) Date of Patent: Nov. 30, 2004

(54) CONVEYOR FOR CONTAINERS

(75) Inventors: Vannino Sartore, Fosso' (IT); Claudio Trebbi, Medicina (IT); Gabriele Gabusi, Castenaso (IT)

(73) Assignee: I.M.A. Industria Macchine Automatiche S.p.A., Ozzano Emilia (Bologna) (IT)

(*) Notice: Subject to any disclaimer, the term of this patent is extended or adjusted under 35 U.S.C. 154(b) by 0 days.

(21) Appl. No.: 10/479,666

(22) PCT Filed: Jun. 10, 2002

(86) PCT No.: PCT/IB02/02108
§ 371 (c)(1),
(2), (4) Date: Dec. 4, 2003

(87) PCT Pub. No.: WO02/100744
PCT Pub. Date: Dec. 19, 2002

(65) Prior Publication Data
US 2004/0149543 A1 Aug. 5, 2004

(30) Foreign Application Priority Data
Jun. 12, 2001 (IT) .................................. BO20010055 U

(51) Int. Cl.⁷ ............................................... B65G 17/34
(52) U.S. Cl. ................................................. 198/803.11
(58) Field of Search ........................ 198/803.11, 473.1, 198/817, 604, 620, 626.3, 803.14

(56) References Cited

U.S. PATENT DOCUMENTS

| | | | | | |
|---|---|---|---|---|---|
| 2,358,292 A | * | 9/1944 | Malhiot | .................. | 198/803.11 |
| 2,639,025 A | * | 5/1953 | Schmitt | .................... | 198/803.5 |
| 3,288,271 A | * | 11/1966 | Burford | .................. | 198/803.11 |
| 3,779,364 A | * | 12/1973 | Kammann | ............... | 198/803.1 |
| 4,893,707 A | * | 1/1990 | Langen et al. | ............ | 198/626.3 |
| 5,238,101 A | * | 8/1993 | Ota et al. | ................. | 198/626.5 |
| 5,560,473 A | * | 10/1996 | Ivancso et al. | ......... | 198/803.11 |

* cited by examiner

Primary Examiner—Richard Ridley
(74) Attorney, Agent, or Firm—William J. Sapone; Coleman, Sudol, Sapone, P.C.

(57) ABSTRACT

A conveyor (1) for containers (2) includes a first and second endless metallic belt (5a, 5b), which are arranged side by side and parallel, and which are mounted on respective driving pulleys having parallel axes. The metallic belts are operated to move with the same velocity in a predetermined forward movement direction (W). Operating means adjust the mutual angular positioning of the driving pulleys. A plurality of retaining elements, first (6a) and second (6b), are removably fastened to the respective metallic belts (5a, 5b) to define corresponding seats (7) for receiving and housing the containers (2), The longitudinal dimension of each of the seats (7) can be changed by acting on the operating means. With a maximum width (200) of the longitudinal dimension of each seat (7), the first and second retaining elements (6a, 6b) defining the seat (7) are situated one beside the other and partially overlapped.

11 Claims, 4 Drawing Sheets

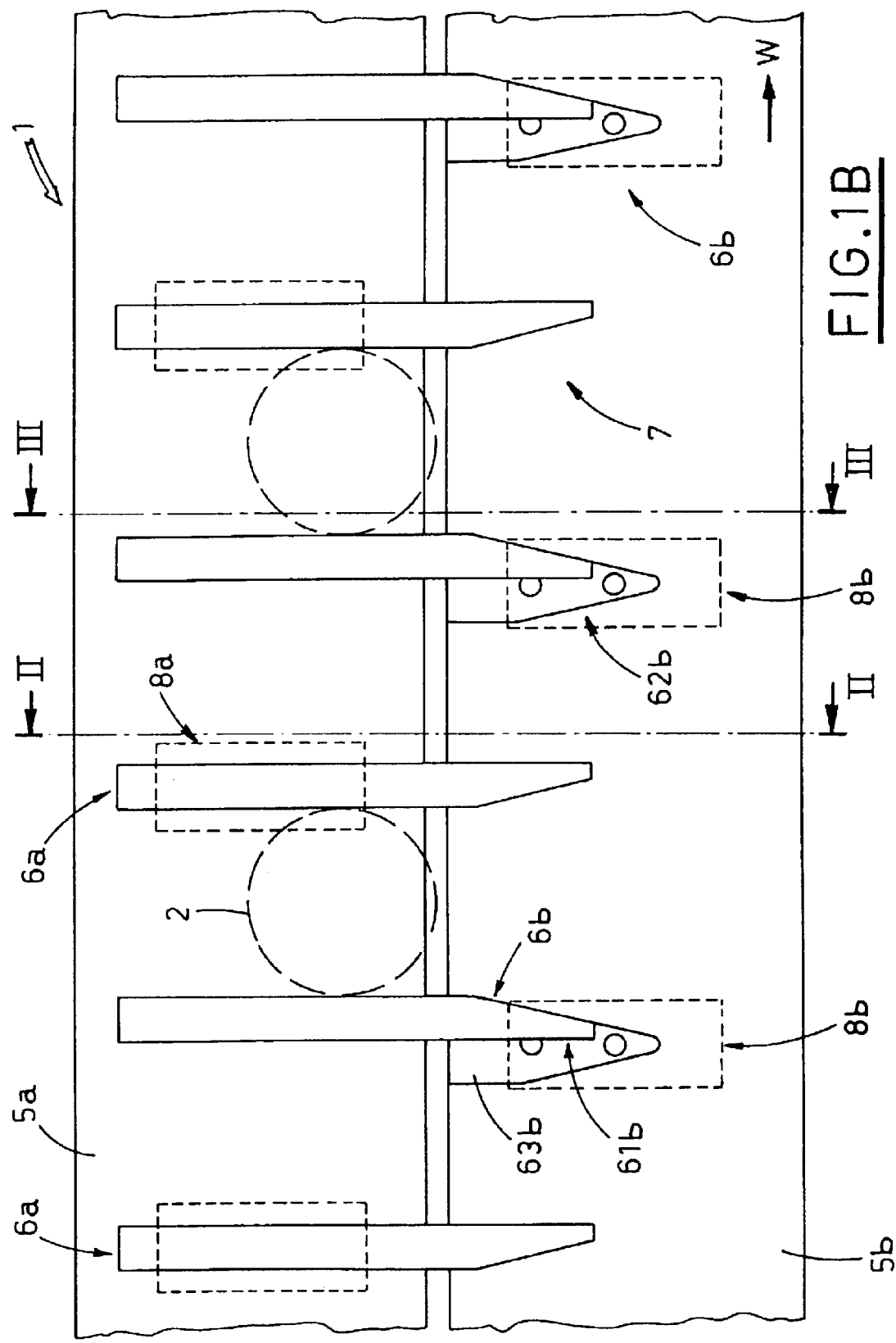

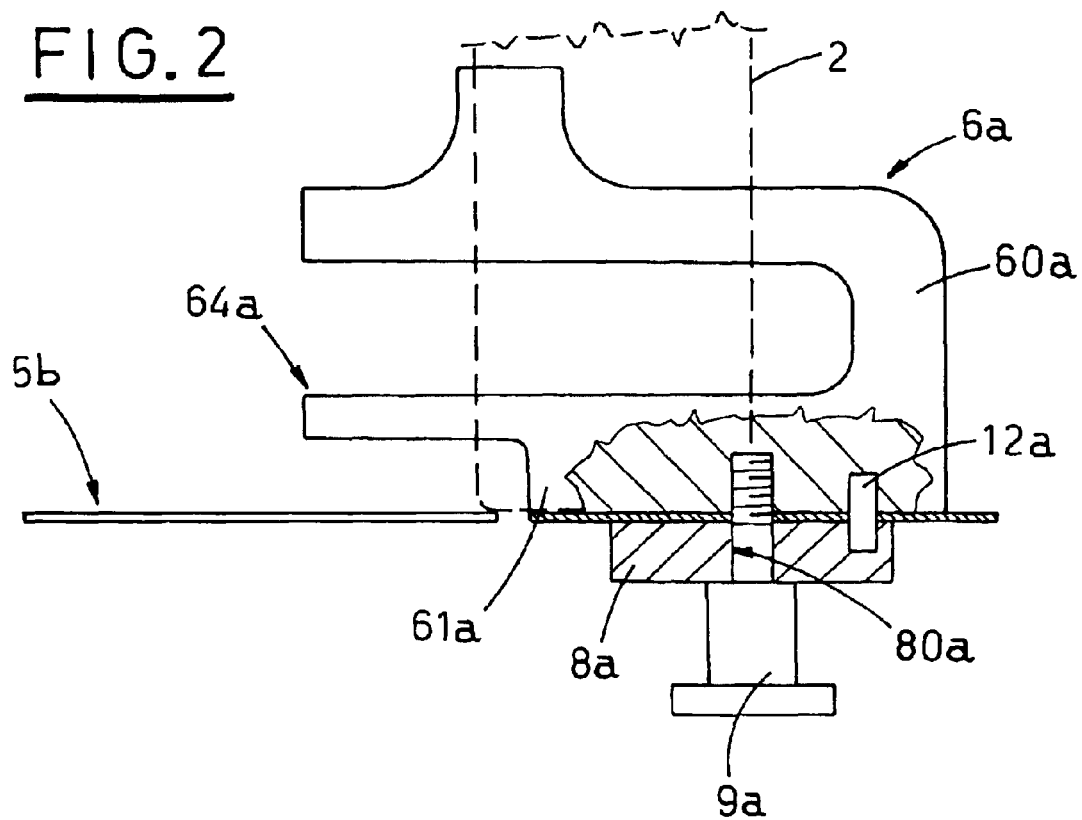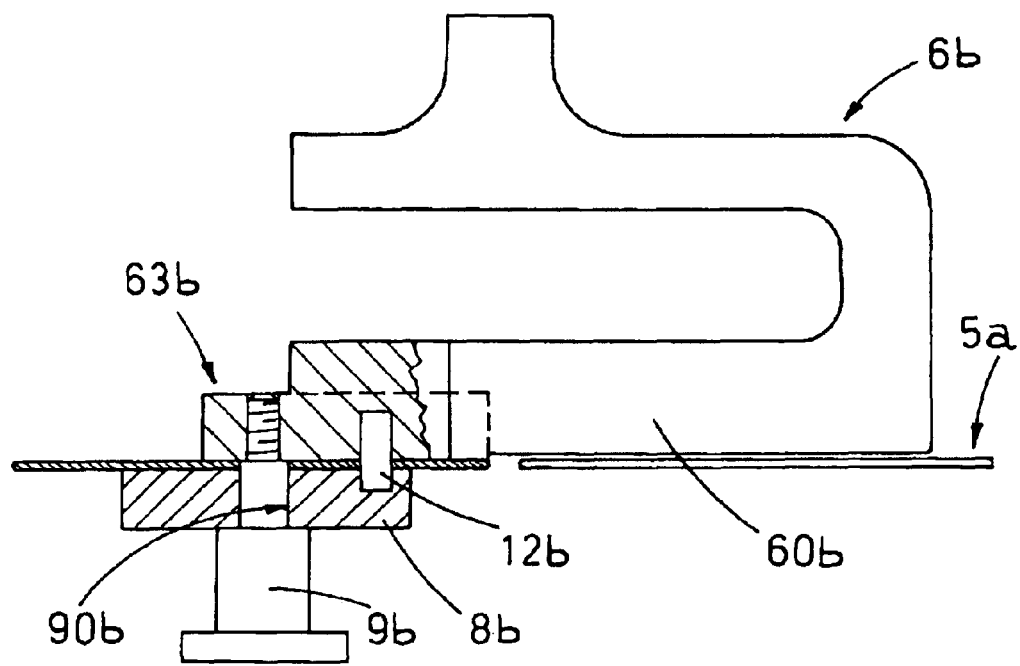

CONVEYOR FOR CONTAINERS

TECHNICAL FIELD

The present invention relates to the technical field concerning automatic packaging of powder or liquid articles into suitable containers, e.g. bottles, ampoules or phials.

In this particular case the present invention relates to a conveyor including a pair of metallic belts, arranged side by side, for conveying containers having various size through a sequence of working stations including e.g. containers filling stations, weighing stations, stations for closing the containers, etc.

DESCRIPTION OF THE PRIOR ART

Currently, the use of smooth metallic belts, is particularly advisable in all cases, in which the conveyors operate in substantially aseptic environments, where high hygiene conditions must be maintained, e.g. for packaging articles in a sterile environment or in isolated system supplied with sterile air.

This need is particularly felt in pharmaceutical products field, where the possibility to work in a sterile environment allows to package products substantially free from impurities and bacterial contamination.

Currently, different types of conveying lines are used for moving the containers, using stationary sliding surfaces, usually made of Teflon, on which the containers are moved by suitable driving means, which generally include one or more belts of synthetic or metallic material.

In cases of especially large conveying paths, endless belts are used, which are driven by a pair of transmission pulleys, driving and driven, respectively.

The conveying lines having single pulling means include one belt or one chain, to which means for gripping or pushing the bottles are fastened.

The gripping means, usually removably fastened to the belt or to the chain, fulfill their task only on a limited range of sizes of the bottles supported on the conveying line.

Another type of conveying line includes pairs of metallic conveying belts, arranged side by side, moved synchronously. Each of the belts is equipped with a plurality of arms extending substantially orthogonal with respect to the forward movement direction, and extending above the adjacent belt.

Opposite arms, fastened to different metallic belts, define receiving seats for containers moved by the conveying line.

SUMMARY OF THE INVENTION

The object of the present invention is to propose a conveyor for containers of different sizes, which assures particularly quick and reliable size change over operations, assuring at the same time best production rate of the conveying line connected thereto.

Another object of the present invention is to propose a conveyor, which maximizes the stability of containers during their movement and assures high standards of functionality and rapidity of the containers size change over operations.

A further object of the present invention is to propose a conveyor, which is simple to obtain and reduces considerably time needed for installation and maintenance operations, facilitating sterilization procedures.

The above-mentioned objects are obtained in accordance with the contents of the claims, by a conveyor for containers including:

a first metallic endless belt and a second metallic endless belt arranged side by side and mounted on respective driving pulleys having parallel axes, the first and second metallic belts being operated to move with the same velocity in a selected forward movement direction;

a plurality of first retaining elements and a plurality of second retaining elements, removably fastened to the respective metallic belts to define corresponding seats for receiving and housing said containers;

said conveyor being characterized in that it includes operating means for changing the longitudinal dimension of each of said seats by adjusting the mutual angular positioning of said driving pulleys, with the first and second retaining elements defining the seat being situated one beside the other and partially overlapped when the longitudinal dimension of each seat reaches the maximum width.

BRIEF DESCRIPTION OF THE DRAWINGS

The characteristic features of the present invention will be pointed out in the following description of a preferred, but not only embodiment, with reference to the enclosed drawings, in which:

FIGS. 1A, 1B are two schematic top views of the proposed gripping system in two particularly significant operation configurations, of maximum and minimum size of the containers;

FIG. 2 is a schematic section view taken along II—II of FIG. 1B;

FIG. 3 is a schematic section view taken along III—III of FIG. 1B:

BEST MODE OF CARRYING OUT THE INVENTION

Figure 1A:
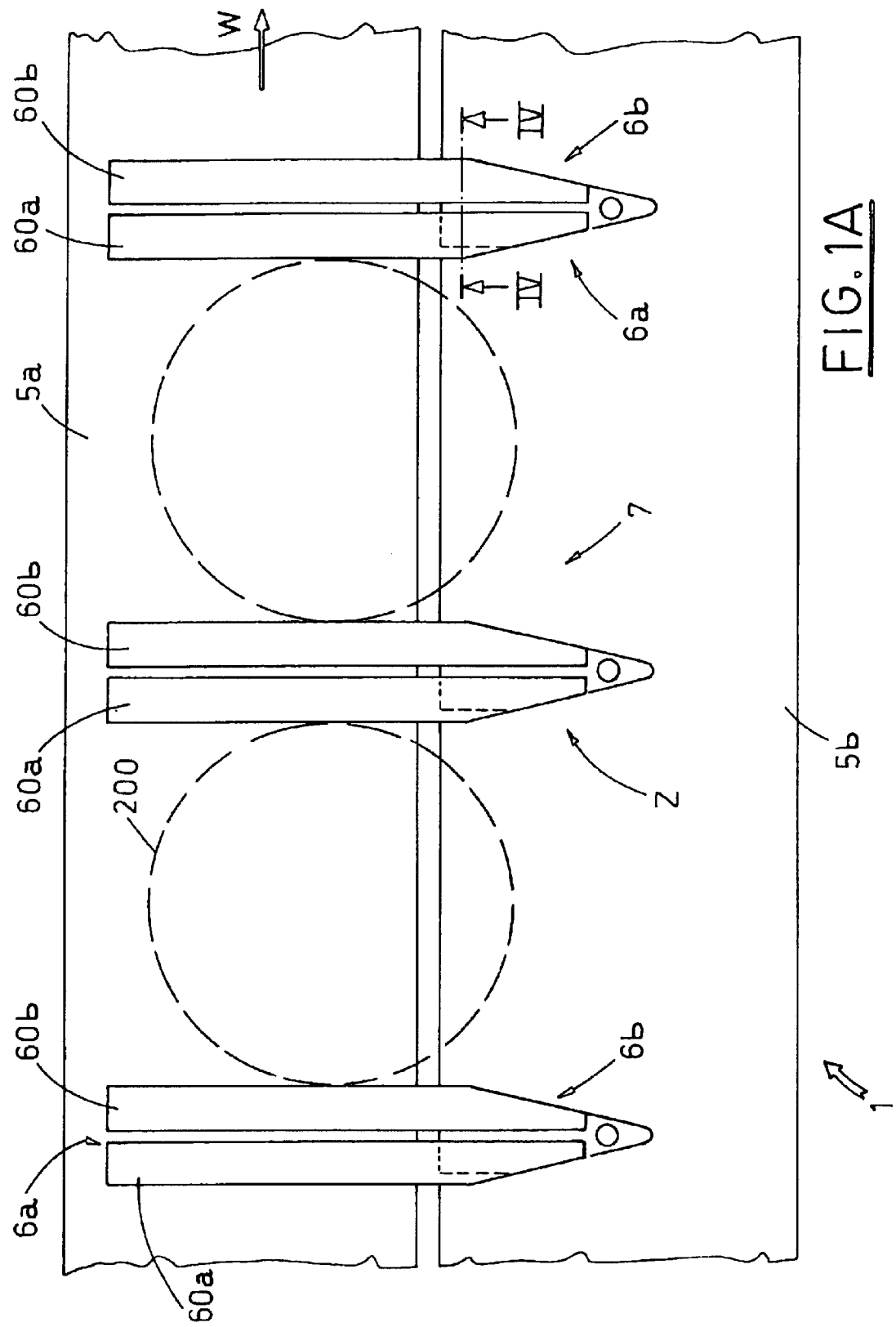

With reference to the above figures, general reference 1 indicates a conveyor including a pair of metallic belts, namely a first belt 5a and a second belt 5b, aimed at receiving containers 2, e.g. bottles, ampoules or phials, resting thereon.

The metallic belts, first 5a and second 5b, are arranged side by side and are of endless type, winding on respective pulleys, driving and driven, having parallel axes (not shown in enclosed Figures).

The metallic belts are operated with the same speed to move in the same horizontal direction W.

The conveyor 1 includes a plurality of retaining elements, first 6a and second 6b, removably connected to respective first metallic belt 5a and second metallic belt 5b and defining corresponding seats 7 for receiving and housing containers 2.

Suitable operating means, not shown since of known type, are provided for adjustment of the mutual angular positioning of the driving pulleys of the metallic belts 5a, 5b, so as to allow to change the dimension of the seats 7, longitudinally with reference to the direction W, and to allow the conveyor 1 to convey the containers 2 of different dimensions.

This adjustment is preferably performed with the metallic belts 5a, 5b, motionless, i.e. in stationary configurations.

The first retaining elements 6a include preferably first arms 60a, e.g. substantially "C"-like extending in a vertical plane orthogonal to the forward movement direction W, equipped with protrusions 64a extending from respective lower wings 61a and surmounting the opposite second metallic belt 5b.

The first arms 60a are removably fastened to the first metallic belt 5a, by relative first fastening means 9a with interposition of a first plate 8a, situated under the first belt 5a.

The first fastening means 9a are preferably threaded screws, engaging with the relative lower wings 61a (FIG. 2).

Suitable stabilizing means 12a, e.g. including a first anti-rotation pin and passing simultaneously through the first metallic belt 5a and the corresponding first arms 60a, stabilize the configuration of the latter with respect to the first metallic belt 5a, substantially preventing the first arms 60a from rotating relative to the belt.

The first anti-rotation pin 12a advantageously also crosses the corresponding first plate 8a.

The second retaining elements 6b include preferably second arms 60b, e.g. substantially "C"-like extending in a vertical plane orthogonal to the forward movement direction W and extend to surmount the first metallic belt 5a (FIG. 3).

Each of the second arms 60b has a fastening base 63b, which forms a corresponding seat 62b including a relative abutment 61b for the protrusion 64a of the adjacent first arm 60a.

The second arms 60b are removably fastened to the second metallic belt 5b, by relative second fastening means 9b, with the interposition of a second plate 8b, situated under the second metallic belt 5b.

The second fastening means 9b are preferably threaded screws, engaging with the relative fastening bases 63b.

Analogously to the first arms 60a, suitable second stabilizing means 12b, e.g. including a second anti-rotation pin, pass simultaneously through the second metallic belt 5b and the corresponding second arms 60b to stabilize the relative configuration of the latter with respect to the second metallic belt 5a, substantially preventing the second arms 60a from rotating relative to the belt.

The second anti-rotation pin 12a crosses advantageously also the corresponding second plate 8b.

Figure 4:
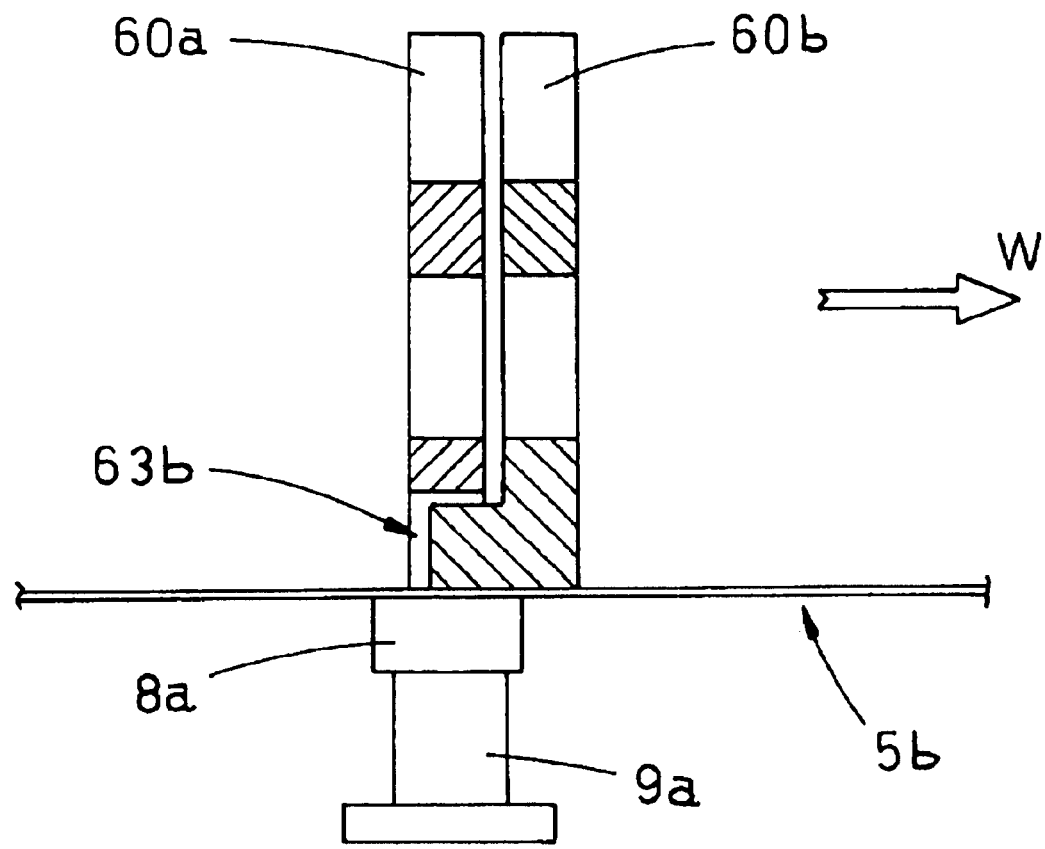
FIG. 4 is a schematic section view taken along IV—IV of FIG. 1A.

According to what is shown in FIG. 4 and in FIG. 1A, when containers 2 having diametrical dimensions considered maximum for the desired use are processed, the longitudinal dimension of the seats 7 transverse to the direction W takes the maximum width, indicated with 200, so as to form a configuration Z for the corresponding retaining elements 6a and 6b, in which the latter are partially overlapped.

Before the metallic belts, first 5a and second 5b, are operated, i.e. when they are in their motionless condition, the mutual angular position of their driving pulleys is suitably adjusted by acting on the operating means so as to adapt the dimensions of the seats 7 to the size of the containers 2 to be moved.

If containers 2 of different size are to be moved, it is necessary to stop the metallic belts, first 5a and second 5b, then act again on the operating means, so as to suitably change the dimensional features of the seats 7.

Consequently, the proposed conveyor for containers of various sizes, of the type including metallic belts, arranged side by side, assures substantially simple and rapid size change over operations, assuring at the same time high production rate of the conveying line associated thereto.

The particular shape of the retaining elements, defining the receiving seats of the containers, allows configurations of best stability of the containers during their movement, assuring high functionality and rapidity characteristics during the size change over operations.

The retaining elements, e.g. "C"-like, can be advantageously geometrically similar, in order to obtain the above stability of the containers, relative to the metallic belts, during their movement step.

The removable fastening of the retaining elements to the respective metallic belts, obtained substantially by threaded screws, is particularly simple and functional and allows to obtain high reliability and productivity characteristics in any operation conditions of the conveyor, thus reducing considerably the time needed for installation and maintenance operations.

Moreover, this assures rapid and easy sterilization of the metallic belts and the respective retaining elements, which allows reducing considerably down time of the proposed conveyor.

What is claimed is:

1. A conveyor (1) for containers (2) including:
   a first metallic endless belt (5a) and a second metallic endless belt (5b) arranged side by side and mounted on respective driving pulleys having parallel axes, the first and second metallic belts being operated to move with the same velocity in a selected forward movement direction (W);
   a plurality of first retaining elements (6a) and a plurality of second retaining elements (6b), removably fastened to the respective metallic belts (5a, 5b) to define corresponding seats (7) for receiving and housing said containers (2) with the first and second retaining elements (6a, 6b) of each seat being situated one beside the other;
   operating means for changing the longitudinal dimension of each of said seats (7) by adjusting the mutual angular positioning of said driving pulleys;
   said conveyor being characterized in that the second retaining elements (6b) include arms (60b) having fastening bases (63b) forming corresponding seats (62b) such that the first and second retaining elements (6a, 6b) are partially overlapped when the longitudinal dimension of each seat (7) reaches the maximum width (200).

2. A conveyor, according to claim 1, characterized in that said first retaining elements (6a), fastened removably to said first metallic belt (5a), include further arms (60a) equipped with protrusions (64a), extending to surmount said second metallic belt (5b).

3. A conveyor, according to claim 2, characterized in that said seats (62b) feature abutments (61b) for said protrusions (64a) when said longitudinal dimension of each of said seats (7) is brought to a maximum width (200).

4. A conveyor, according to claim 2, characterized in that said first arms (60a) are substantially "C"-shaped and extend in a vertical plane orthogonal to said forward movement direction (W), and include said protrusions (64a) extending from respective lower wings (61a).

5. A conveyor, according to claim 3, characterized in that said second arms (60b) are substantially "C"-shaped and extend in a vertical plane orthogonal to said forward movement direction (W), and extend, so as to surmount said first metallic belt (5a).

6. A conveyor, according to claim 2, characterized in that it includes first stabilizing means (12a) fastened to at least said first metallic belt (5a) and said first arms (60a), to stabilize the relative configuration of the latter with respect to the first metallic belt (5a).

7. A conveyor, according to claim 3, characterized in that it includes second stabilizing means (12b), fastened to at least said second metallic belt (5b) and said second arms (60b), to stabilize the relative configuration of the latter with respect to the second metallic belt (5b).

8. A conveyor, according to claim 6, characterized in that said first stabilizing means (12a) include at least one anti-rotation pin passing through said first metallic belt (5a) and said first arms (60a).

9. A conveyor, according to claim 7, characterized in that said second stabilizing means (12b) include at least one anti-rotation pin passing through said second metallic belt (5b) and said second arms (60b).

10. A conveyor, according to claim 4, characterized in that it includes first stabilizing means (12a) fastened to at least said first metallic belt (5a) and said first arms (60a), to stabilize the relative configuration of the latter with respect to the first metallic belt (5a).

11. A conveyor, according to claim 5, characterized in that it includes second stabilizing means (12b), fastened to at least said second metallic belt (5b) and said second arms (60b), to stabilize the relative configuration of the latter with respect to the second metallic belt (5b).

* * * * *